(12) United States Patent
Tanada (10) Patent No.: US 9,896,997 B2
(45) Date of Patent: Feb. 20, 2018

(54) CONTROL APPARATUS FOR INTERNAL COMBUSTION ENGINE

(71) Applicant: TOYOTA JIDOSHA KABUSHIKI KAISHA, Toyota-shi, Aichi-ken (JP)

(72) Inventor: Masayuki Tanada, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 22 days.

(21) Appl. No.: 14/922,477

(22) Filed: Oct. 26, 2015

(65) Prior Publication Data

US 2016/0115859 A1 Apr. 28, 2016

(30) Foreign Application Priority Data

Oct. 28, 2014 (JP) .................................. 2014-219749
Apr. 30, 2015 (JP) .................................. 2015-093343

(51) Int. Cl.
| | |
|---|---|
| *F02B 33/44* | (2006.01) |
| *F02B 39/16* | (2006.01) |
| *F02B 39/14* | (2006.01) |
| *F02B 39/10* | (2006.01) |
| *F02B 39/04* | (2006.01) |
| *F02B 37/10* | (2006.01) |

(Continued)

(52) U.S. Cl.
CPC .............. *F02B 39/16* (2013.01); *F02B 37/10* (2013.01); *F02B 37/12* (2013.01); *F02B 37/16* (2013.01); *F02B 39/04* (2013.01); *F02B 39/10* (2013.01); *F02B 39/14* (2013.01); *F02D 41/0007* (2013.01); *F02D 41/10* (2013.01); *F02D 2200/602* (2013.01); *Y02T 10/144* (2013.01)

(58) Field of Classification Search
CPC .......... F02B 39/10; F02B 39/14; F02B 39/16; F02B 37/10; F02B 37/12; F02D 2200/602; F02D 41/0007
USPC ........................................ 60/608, 607, 605.3
See application file for complete search history.

(56) References Cited

U.S. PATENT DOCUMENTS

| | | |
|---|---|---|
| 4,649,307 A | 3/1987 | Bech |
| 4,745,755 A | 5/1988 | Kawamura |

(Continued)

FOREIGN PATENT DOCUMENTS

| | | |
|---|---|---|
| EP | 0210833 A2 | 2/1987 |
| JP | 2007-120376 A | 5/2007 |

(Continued)

*Primary Examiner* — Ngoc T Nguyen
(74) *Attorney, Agent, or Firm* — Andrews Kurth Kenyon LLP (57) ABSTRACT

A control apparatus for an internal combustion engine executes shaft heating control that controls the energization of an electric motor so that a driving torque and a braking torque are alternately imparted from the electric motor to a rotary shaft when the temperature of a lubricating oil (lubricant) is less than or equal to a predetermined value. According to the shaft heating control, in a case where a target intake air pressure Pt is higher than an actual intake air pressure P, a proportion that a driving torque impartation period $\tau_D$ occupies in a cycle T is increased relative to a case where Pt and P are equal or substantially equal, and in a case where Pt is lower than P, the proportion $\tau_D$ that the driving torque impartation period occupies in the cycle T is decreased relative to a case where Pt and P are equal or substantially equal.

7 Claims, 8 Drawing Sheets

(51) Int. Cl.
*F02B 37/12* (2006.01)
*F02B 37/16* (2006.01)
F02D 41/10 (2006.01)
F02D 41/00 (2006.01)

(56) References Cited

U.S. PATENT DOCUMENTS

| | | | |
|---|---|---|---|
| 4,769,993 | A | 9/1988 | Kawamura |
| 2006/0196183 | A1 | 9/2006 | Isogai |
| 2011/0095717 | A1 | 4/2011 | Takizawa |
| 2011/0203271 | A1 | 8/2011 | Spooner |

FOREIGN PATENT DOCUMENTS

| | | |
|---|---|---|
| JP | 2008-121466 A | 5/2008 |
| JP | 2011-089625 A | 5/2011 |
| JP | 2011-125121 A | 6/2011 |

CONTROL APPARATUS FOR INTERNAL COMBUSTION ENGINE

CROSS-REFERENCE TO RELATED APPLICATIONS

The present application claims priority to Japenese Patent Application Nos. 2014-219749 filed on Oct. 28, 2014 and 2015-093343 filed Apr. 30, 2015, which are incorporated herein by reference in their entireties.

BACKGROUND

Technical Field

Preferred embodiments relate to a control apparatus for an internal combustion engine, and more particularly to a control apparatus for an internal combustion engine that is suitable as an apparatus that controls an internal combustion engine that includes an electric supercharger.

Background Art

An internal combustion engine that includes an electric-motor-assisted turbosupercharger that is capable of assisting driving of a compressor by means of an electric motor has already been disclosed in, for example, Japanese Patent Laid-Open No. 2007-120376. The electric motor is electrically connected to an inverter that converts direct current supplied from a battery to alternating current, and supplies the alternating current to the electric motor. In this internal combustion engine, a power line that is provided between the electric motor and the inverter is wound around an exhaust pipe. According to this configuration, when an alternating current is supplied from the inverter to the electric motor, an eddy current is generated in the exhaust pipe around which the conducting wire has been wound, and the exhaust pipe can be heated utilizing Joule heat (induction heating) that is generated by the eddy current.

LIST OF RELATED ART

Following is a list of patent literatures which the applicant has noticed as related arts of the present invention.
[Patent Literature 1]
  Japanese Patent Laid-Open No. 2007-120376
[Patent Literature 2]
  Japanese Patent Laid-Open No. 2011-125121
[Patent Literature 3]
  Japanese Patent Laid-Open No. 2011-089625

Technical Problem

Apart from the aforementioned electric-motor-assisted turbosupercharger, an electric compressor of a type that is not combined with a turbosupercharger and is driven by an electric motor is also available as an electric supercharger that utilizes an electric motor. In the case of each of these types of electric supercharger, if the temperature of a lubricant for lubricating a bearing of a rotary shaft of the electric supercharger is low, the friction at a sliding site will increase because the viscosity of the lubricant is high. This leads to a decrease in the efficiency of the supercharger. Therefore, it is desired to quickly raise the temperature of the lubricant at a time when the temperature of the lubricant is low, such as immediately after engine startup. However, it takes time to raise the temperature of a lubricant utilizing the transfer of heat from the internal combustion engine, and the amount of time also varies depending on the operating situation after engine startup. Further, providing a separate mechanism for heating the lubricant leads to an increase in costs. In addition, in a case where an electric motor is utilized when an acceleration request is issued after engine startup, induction heating that is caused by an eddy current that is generated in the aforementioned rotary shaft made of metal can be expected to arise accompanying energization of the electric motor. However, in a case where induction heating is utilized in such a manner in which issuance of an acceleration request acts as the trigger for the induction heating, whether or not the induction heating can be utilized depends on whether or not an acceleration request is actually issued after engine startup.

In the case of utilizing induction heating that accompanies energization of an electric motor, it is possible to heat a lubricant without the necessity of changing the hardware configuration. Consequently, it can be said that if an eddy current can be generated efficiently, the utilization of induction heating is an effective measure when it is required to heat a lubricant. On the other hand, if the rotational speed of the electric supercharger changes when a current is passed to the electric motor to utilize induction heating, there is a possibility that the intake air pressure will change and that an engine torque that is different to the engine torque intended by the driver will be generated. Accordingly, in order to enable the effective heating of a lubricant utilizing induction heating, it is desirable to favorably achieve both efficient generation of an eddy current and intake air pressure control during utilization of the induction heating.

SUMMARY

Preferred embodiments address the above-described problem and have an object to provide a control apparatus for an internal combustion engine that is configured to be capable of heating a lubricant using an electric supercharger while favorably achieving both efficient generation of an eddy current as well as intake air pressure control during utilization of induction heating.

A control apparatus for an internal combustion engine according to preferred embodiments controls an internal combustion engine which includes an electric supercharger. The electric supercharge has a compressor that is disposed in an intake passage and that is configured to supercharge intake air and an electric motor that is configured to drive a rotary shaft made of metal of the compressor. The rotary shaft has a bearing that is lubricated by a lubricant. The control apparatus includes a controller that is configured to, in a case where a temperature of the lubricant is less than or equal to a predetermined value, control energization of the electric motor so that intermittent operation is executed in which impartation of a driving torque from the electric motor to the rotary shaft and stopping of the impartation of the driving torque are alternately performed. Also, in a case where a target intake air pressure is higher than an actual intake air pressure, the controller is configured to increase a proportion that a driving torque impartation period occupies in a unit period including one or a plurality of cycles of the intermittent operation in comparison to a case where the target intake air pressure is equal or substantially equal to the actual intake air pressure, and in a case where the target intake air pressure is lower than the actual intake air pressure, the controller is configured to decrease the proportion that the driving torque impartation period occupies in the unit period in comparison to a case where the target intake air pressure is equal or substantially equal to the actual intake air pressure.

The controller may be configured to control energization of the electric motor so that a braking torque is imparted from the electric motor to the rotary shaft during a period in which impartation of the driving torque is stopped during the intermittent operation.

The controller may be configured to, in a case where the target intake air pressure is higher than the actual intake air pressure, increase the proportion that the driving torque impartation period occupies in the unit period as a difference between the target intake air pressure and the actual intake air pressure increases.

The controller may be configured to, in a case where the target intake air pressure is lower than the actual intake air pressure, decrease the proportion that the driving torque impartation period occupies in the unit period as a difference between the target intake air pressure and the actual intake air pressure increases.

The controller may be configured to execute the intermittent operation in a case where a depression amount of an accelerator pedal of a vehicle in which the internal combustion engine is mounted is less than or equal to a predetermined value.

The controller may be configured to, in a case where the temperature of the lubricant is low, increase an electric current or an electric voltage that is applied to the electric motor to execute the intermittent operation in comparison to a case where the temperature of the lubricant is high.

The controller may be an electric-motor-assisted turbosupercharger that includes a turbine that is driven by exhaust energy as well as the compressor that is configured to be driven by the electric motor.

According to the control apparatus of preferred embodiments, in a case where the temperature of a lubricant is less than or equal to a predetermined value, by controlling energization of an electric motor so that intermittent operation is executed in which impartation of a driving torque from the electric motor to a rotary shaft of an electric supercharger and stopping of the impartation of the driving torque are alternately performed, a magnetic flux change repeatedly occurs around a metal member (at least, the aforementioned rotary shaft) that the electric supercharger includes, and hence an eddy current can be efficiently generated in the metal member. Further, according to the control apparatus of preferred embodiments, a proportion that a driving torque impartation period occupies in a unit period is adjusted in accordance with a result of comparing the size of a target intake air pressure and the size of an actual intake air pressure. By this means, heating of a lubricant that is used in the electric supercharger can be performed while favorably achieving both efficient generation of an eddy current and intake air pressure control during utilization of induction heating.

DETAILED DESCRIPTION

First Embodiment

First, a first embodiment of the present invention will be described referring to FIG. 1 to FIG. 8.

[System Configuration of First Embodiment]

Figure 1:
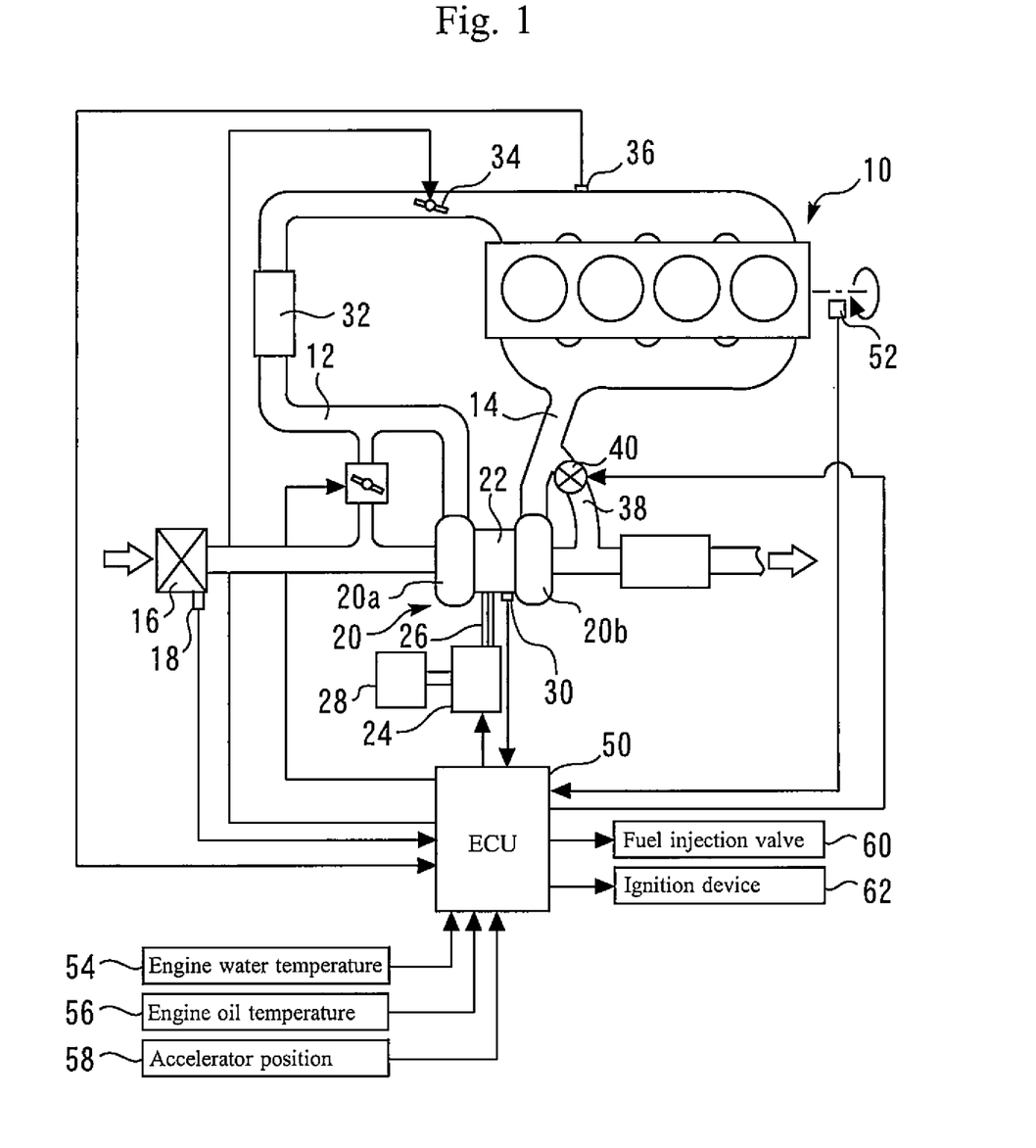
FIG. 1 is a view for schematically illustrating a system configuration according to a first embodiment of the present invention.

FIG. 1 is a view for schematically illustrating the system configuration according to the first embodiment of the present invention. An internal combustion engine 10 illustrated in FIG. 1 is a spark-ignition type engine (as one example, a gasoline engine), and is mounted in a vehicle and used as a power source of the vehicle. Although a spark-ignition type engine is adopted here as one example of the internal combustion engine 10, internal combustion engines that are an object of the present disclosure also include a compression-ignition type engine.

An intake passage 12 and an exhaust passage 14 communicate with the respective cylinders of the internal combustion engine 10. An air cleaner 16 is provided in the vicinity of an inlet of the intake passage 12. An air flow sensor 18 that outputs a signal in accordance with a flow rate of air that flows through the intake passage 12 is provided at the air cleaner 16. A compressor 20a of a turbosupercharger 20 for supercharging intake air is disposed in the intake passage 12 at a position on a downstream side relative to the air cleaner 16. The turbosupercharger 20 includes a turbine 20b that is provided in the exhaust passage 14 and that operates by means of the exhaust energy of exhaust gas. The compressor 20a is rotationally driven by the exhaust energy of exhaust gas that enters the turbine 20b. In addition, the turbosupercharger 20 is configured as an electric-motor-assisted turbosupercharger that is capable of assisting driving of the compressor 20a by means of an electric motor 22.

Figure 2:
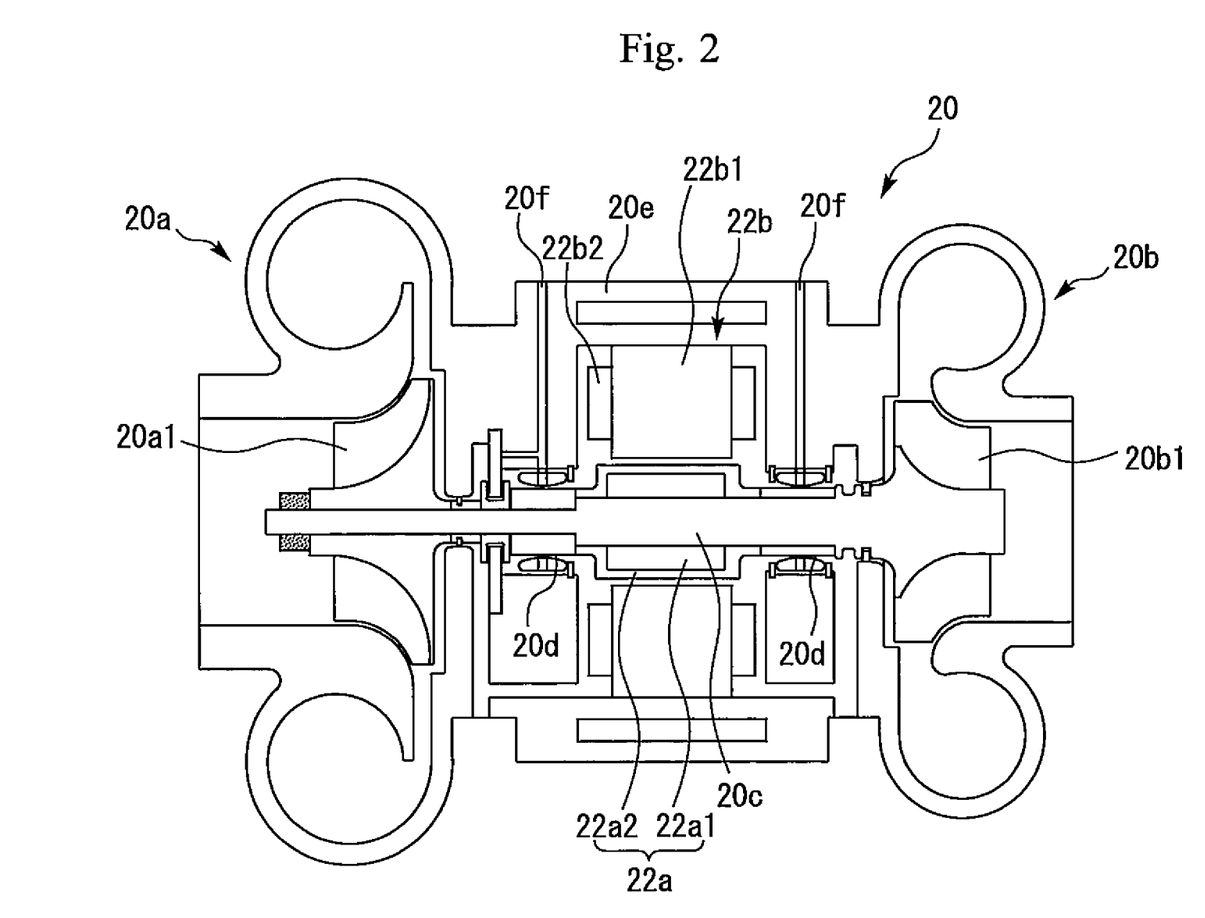
FIG. 2 is a cross-sectional view for schematically illustrating the configuration of a turbosupercharger illustrated in FIG. 1.

FIG. 2 is a cross-sectional view for schematically illustrating the configuration of the turbosupercharger 20 shown in FIG. 1. As shown in FIG. 2, the turbosupercharger 20 includes a rotary shaft 20c that connects a compressor impeller 20a1 and a turbine impeller 20b1. The rotary shaft 20c is supported by two bearings 20d. A slide bearing system is adopted here for the bearings 20d, and a lubricant (specifically, a lubricating oil) is supplied between the rotary shaft 20c and the bearings 20d for lubrication. Therefore, an oil supply passage 20f for supplying lubricating oil to the bearings 20d is provided in a housing 20e. An engine lubricating oil for lubricating each part of the internal combustion engine 10 is used as the lubricating oil.

The rotary shaft 20c of the turbosupercharger 20 is made of metal, and is configured to also function as a rotary shaft of a rotor 22a of the electric motor 22. More specifically, the electric motor 22 is arranged so as to lie between the compressor 20a and the turbine 20b. The rotor 22a is attached to the outer circumference of the rotary shaft 20c. The rotor 22a is configured by a magnet 22a1 and a magnet holding member 22a2 made of metal that is formed so as to cover the magnet 22a1. A stator 22b is disposed inside the housing 20e. The stator 22b is configured by a stator core 22b1 that is formed so as to cover the rotor 22a via an air gap, and a stator coil 22b2 wound around the stator core 22b1. The rotor 22a functions as a magnetic field of the electric motor 22, and the stator 22b functions as an armature of the electric motor 22.

More specifically, the electric motor 22 is a permanent magnet synchronous electric motor that includes the three-phase (U-phase, V-phase and W-phase) stator coil 22b2 and the magnet 22a1 that is a permanent magnet, and utilizes a three-phase alternating current. The electric motor 22 is electrically connected through a power line 26 to an inverter 24. The inverter 24 converts a direct current from a battery (direct-current power source) 28 into an three-phase alternating current, and supplies the three-phase alternating current to the electric motor 22. The electric motor 22 includes a resolver 30 that detects a rotational position of the rotary shaft 20c (magnetic pole positions of the rotor 22a).

An intercooler 32 that cools intake air that is supercharged by the compressor 20a is disposed in the intake passage 12 at a position on the downstream side relative to the compressor 20a. An electronically controlled throttle valve 34 that opens and closes the intake passage 12 is disposed in the intake passage 12 at a position on the downstream side relative to the intercooler 32. An intake air pressure sensor 36 that detects an intake air pressure (supercharging pressure) is installed in the intake passage 12 at a position on the downstream side relative to the throttle valve 34. Further, an exhaust bypass passage 38 that bypasses the turbine 20b is connected to the exhaust passage 14. An electronically controlled waste gate valve (WGV) 40 that opens and closes the exhaust bypass passage 38 is disposed in the exhaust bypass passage 38. The supercharging pressure can be adjusted by adjusting the opening degree of the WGV 40.

In addition, as a control apparatus that controls the internal combustion engine 10, the system of the present embodiment includes an electronic control unit (ECU) 50 and drive circuits (drive circuits other than the inverter 24 are not illustrated in the drawings) for driving various actuators that are described below. The ECU 50 includes at least an input/output interface, a memory, and a central processing unit (CPU), and performs control of the entire system of the internal combustion engine 10. The input/output interface is configured to take in sensor signals from various sensors installed in the internal combustion engine 10 or the vehicle in which the internal combustion engine 10 is mounted, and to also output actuating signals to various actuators provided in the internal combustion engine 10. The sensors from which the ECU 50 takes in signals include, in addition to the aforementioned air flow sensor 18 and intake air pressure sensor 36, various sensors for acquiring the engine operating state, such as a crank angle sensor 52 for detecting a crank angle, a water temperature sensor 54 that detects an engine cooling water temperature, and an oil temperature sensor 56 that detects an engine lubricating oil temperature. An accelerator position sensor 58 for detecting a depression amount (accelerator position) of an accelerator pedal of the vehicle is also included in the aforementioned sensors. In addition to the above described electric motor 22, throttle valve 34 and WGV 40, the actuators to which the ECU 50 outputs actuating signals also include various actuators for controlling engine operations, such as a fuel injection valve 60 that injects fuel into a cylinder or into an intake port of the internal combustion engine 10 and an ignition device 62 for igniting an air-fuel mixture inside a cylinder. Various control programs and maps and the like for controlling the internal combustion engine 10 are stored in the memory. The CPU reads out a control program or the like from the memory and executes the control program or the like, and generates actuating signals for the various actuators based on sensor signals taken in.

[Control of First Embodiment]
(Electric Assist by Electric Motor)

Figure 3:
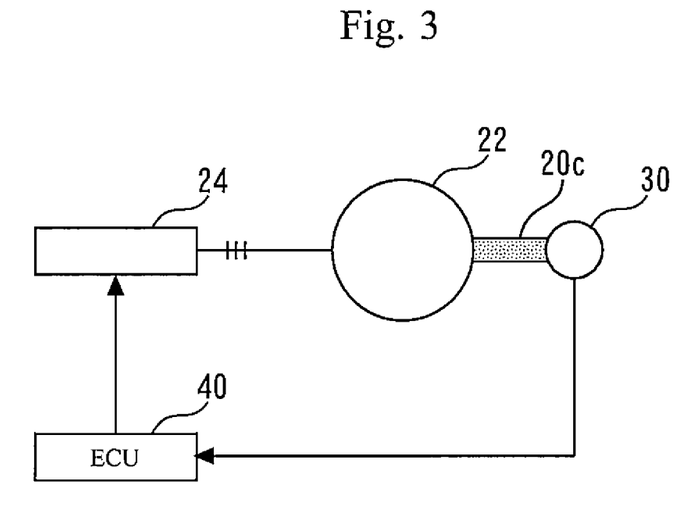
FIG. 3 is a view for describing the configuration of a control system of an electric motor illustrated in FIG. 1.
Figure 4:
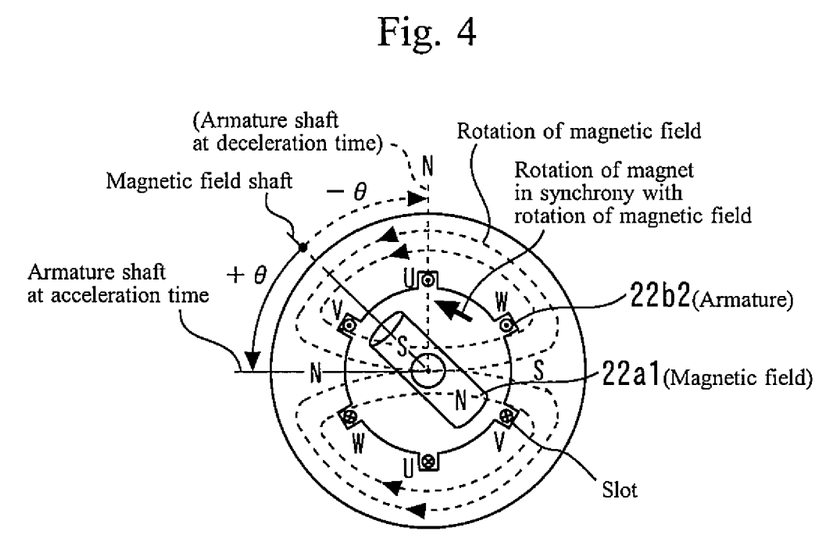
FIG. 4 is a view for describing a principle according to which a permanent magnet synchronous electric motor rotates.

FIG. 3 is a view for describing the configuration of a control system of the electric motor 22 shown in FIG. 1. FIG. 4 is a view for describing a principle according to which the permanent magnet synchronous electric motor 22 rotates. The inverter 24 artificially generates an alternating voltage with a sine wave pattern from a direct-current voltage by utilizing pulse width modulation (PWM) control. Further, the inverter 24 outputs a three-phase alternating voltage in which the respective phases are 120° out of phase with each of the other phases by controlling on/off states of switching elements (not illustrated in the drawings) corresponding to the stator coil 22b2 of the respective phases. As a result, a three-phase alternating current in which the respective phases are similarly 120° out of phase with each of the other phases can be supplied to the stator coil 22b2 of the respective phases of the electric motor 22. When the three-phase alternating current is applied to the stator coil 22b2, as shown in FIG. 4, a rotating magnetic field is generated around the stator 22b. The rotating magnetic field rotates around the shaft center of the rotary shaft 20c at a rotational speed that corresponds to the frequency of the three-phase alternating current.

By controlling the rotating magnetic field that is generated as described above in accordance with the rotational position and rotational speed of the rotor 22a, the rotor 22a can be caused to rotate while attracting the magnet 22a1 of the rotor 22a with the rotating magnetic field (that is, the rotor 22a can be caused to rotate in synchrony with the rotating magnetic field). Here, as viewed from the axial direction of the rotor 22a, an angle which is formed by a armature shaft that is indicated by an NS direction of the rotating magnetic field and that passes through the shaft center of the rotor 22a and a magnetic field axis that is indicated by an NS direction of the magnet 22a1 and that passes through the shaft center of the rotor 22a is referred to as a "load angle θ". Here, the load angle θ in a case where the armature shaft is advancing in the rotation direction (the counterclockwise rotation direction in FIG. 4) of the rotating magnetic field relative to the magnetic field axis is taken to be a positive angle.

In a case where the rotor 22a is rotating in synchrony with the rotating magnetic field so that the load angle θ is zero, the electric motor 22 does not generate torque. On the other hand, in a case where, as shown in FIG. 4, the rotor 22a is rotating in synchrony with the rotating magnetic field so that a positive load angle θ arises, since a force of attraction acts from the rotating magnetic field with respect to the magnet 22a1, the electric motor 22 generates a driving torque. Accordingly, by setting a positive load angle θ so that the electric motor 22 can generate a driving torque, the electric motor 22 can impart a driving torque to the rotary shaft 20c of the turbosupercharger 20 to thereby accelerate rotation of the rotary shaft 20c. That is, driving of the compressor 20a by the turbine 20b that utilizes exhaust energy can be assisted by electrical driving using the electric motor 22.

More specifically, in the case of performing electric motor assist, the ECU 50 issues an instruction to the inverter 24 so as to generate a three-phase alternating voltage of approximately the same frequency as a frequency that corresponds to the turbo rotational speed. At such time, the ECU 50 acquires the rotational position (position of magnetic poles) and rotational speed of the rotor 22a using the resolver 30, and issues an instruction to the inverter 24 to generate a three-phase alternating voltage with phases that satisfy a predetermined positive load angle θ for maintaining the attraction of the rotor 22a by the rotating magnetic field to cause the rotor 22a to be rotated. Variable-voltage variable-frequency control is used here as the control of the rotational speed of the electric motor 22 by the inverter 24.

(Outline of Control in First Embodiment)

When a magnetic flux change is induced at the stator 22b by generating a rotating magnetic field, an eddy current is generated according to the principle of electromagnetic induction at the surface of the rotary shaft 20c that is made of metal and that receives the influence of the magnetic flux change. Apart from the rotary shaft 20c, such an eddy current can also arise at the surfaces on metal members disposed around the stator 22b (the magnet holding member 22a2 and bearings 20d and the like). As a result, Joule heat arises because of the electric resistance of the rotary shaft 20c and the like, and the temperature of the rotary shaft 20c and the like increases (induction heating). Further, heat is generated by hysteresis loss in the magnet 22a1 accompanying the magnetic flux change. When these types of heat are transmitted to the bearings 20d, the oil film temperature rises and the viscosity of the lubricating oil decreases. Consequently, the efficiency of the turbosupercharger 20 increases because of a decrease in friction between the rotary shaft 20c and the bearings 20d. This leads to an improvement in the fuel efficiency of the vehicle.

It can be said that the lubricating oil temperature can be effectively raised if an eddy current can be effectively generated at the rotary shaft 20c and the like at a time that the lubricating oil temperature is low, such as immediately after engine startup. However, there is a possibility that inducing a magnetic flux change in order to generate an eddy current without giving particular consideration to the effects thereof will produce a change in the rotational speed of the rotary shaft 20c and adversely affect the intake air pressure control including the supercharging pressure control. Accordingly, in a case of performing heating of lubricating oil it is necessary to enable the favorable achievement of both efficient generation of an eddy current and intake air pressure control during utilization of induction heating.

Figure 5:
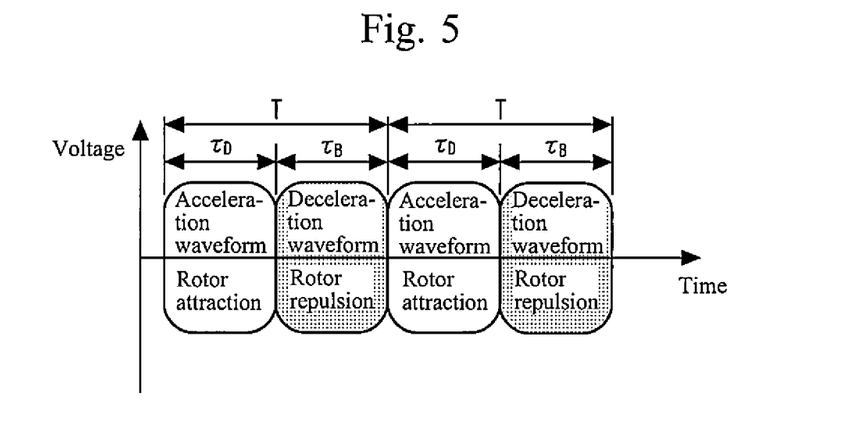
FIG. 5 is a view for describing shaft heating control in the first embodiment of the present invention.

FIG. 5 is a view for describing shaft heating control in the first embodiment of the present invention. According to the present embodiment a configuration is adopted in which, in a case where the temperature of the lubricating oil of the turbosupercharger 20 is less than or equal to a predetermined value, energization of the electric motor 22 is controlled so that an operation is executed that alternately imparts a driving torque and a braking torque from the electric motor 22 to the rotary shaft 20c in a predetermined cycle T. Hereunder, this control is referred to as "shaft heating control". An example illustrated in FIG. 5 is an example of a case where, in the cycle T, a proportion that a driving torque impartation period $\tau_D$ occupies and a proportion that a braking torque impartation period $\tau_B$ occupies are equal. More specifically, the shaft heating control of the present embodiment is control that executes intermittent operation in which impartation of driving torque is performed and impartation of the driving torque is stopped in an alternating manner, and the braking torque impartation period $\tau_B$ corresponds to a period in which impartation of the driving torque is stopped during the intermittent operation. The cycle T corresponds to one cycle of the intermittent operation.

In the present embodiment, the proportions illustrated in FIG. 5 are used in a case where the target intake air pressure and the actual intake air pressure are equal or substantially equal. In a case where the target intake air pressure is higher than the actual intake air pressure, the proportion that the driving torque impartation period $\tau_D$ occupies in the cycle T is increased in comparison to when the target intake air pressure is equal or substantially equal to the actual intake air pressure. On the other hand, if the target intake air pressure is lower than the actual intake air pressure, the proportion that the driving torque impartation period $\tau_D$ occupies in the cycle T is decreased in comparison when the target intake air pressure is equal or substantially equal to the actual intake air pressure.

More specifically, in the present embodiment a configuration is adopted in which the shaft heating control is performed in a case where the lubricating oil temperature is less than or equal to a predetermined value and a depression amount of the accelerator pedal is less than or equal to a predetermined value (for example, an amount corresponding to 30% out of the full depression amount).

When the electric motor 22 imparts a driving torque to the rotary shaft 20c in accordance with the shaft heating control, acceleration of the rotation of the rotary shaft 20c is promoted. On the other hand, when the electric motor 22 imparts a braking torque to the rotary shaft 20c in accordance with the shaft heating control, deceleration of the rotation of the rotary shaft 20c is promoted. Accordingly, if the aforementioned cycle T in the shaft heating control is too long, there is a possibility that fluctuations in the turbo rotational speed will increase and such fluctuations will adversely affect the drivability and the like of the internal combustion engine 10. Consequently, it is desirable for the cycle T to be less than or equal to 0.2 seconds (as a frequency, greater than or equal to 5 Hz). In the present embodiment, as one example, the cycle T is set to 0.2 seconds.

Figure 6A:
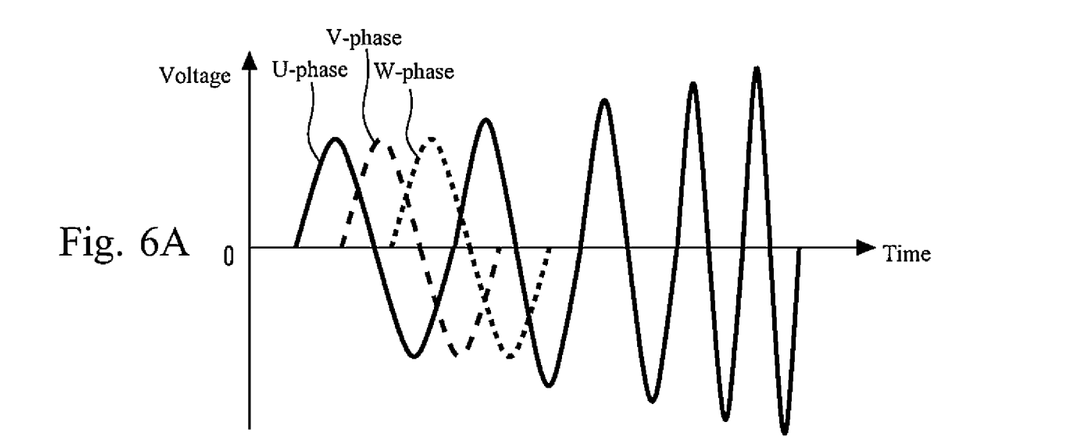
FIGS. 6A and 6B are time charts illustrating an acceleration waveform and a deceleration waveform of a three-phase alternating voltage that is used in the shaft heating control.
Figure 6B:
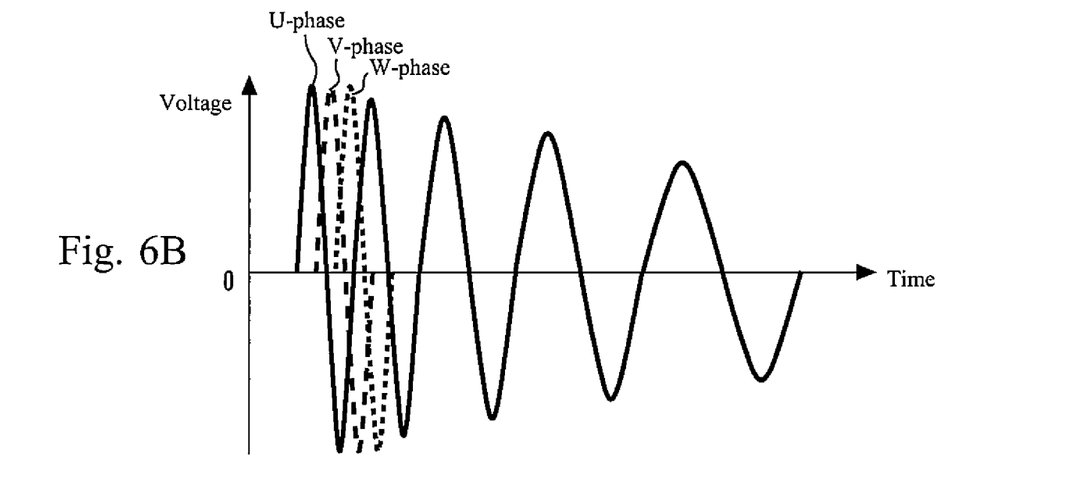

FIGS. 6A and 6B are time charts illustrating an acceleration waveform and a deceleration waveform of a three-phase alternating voltage used in the shaft heating control. FIG. 6A illustrates an example of a waveform (acceleration waveform) of the three-phase alternating voltage when a driving torque is imparted to the rotary shaft 20c to promote acceleration thereof. FIG. 6B illustrates an example of a waveform (deceleration waveform) of the three-phase alternating voltage when a braking torque is imparted to the rotary shaft 20c to promote deceleration thereof. Note that, the waveform of the three-phase alternating current in a case where the three-phase alternating voltage is applied to the stator coil 22b2 as described above is also a three-phase alternating waveform in which the respective phases are 120° out of phase with each of the other phases, similarly to the three-phase alternating voltage. Although an example of controlling a three-phase alternating voltage has been described here in order to control acceleration and deceleration of rotation of the rotary shaft 20c, a configuration may also be adopted so as to control a three-phase alternating current instead of controlling a three-phase alternating voltage. Further, with respect to the waveforms that are represented by two types of different dashed lines in FIGS. 6A and 6B, although only a part of each of the waveforms is illustrated, changes in these waveforms are similar to changes in the waveform illustrated by the solid lines.

First, the acceleration waveform will be described. In order to impart a driving torque to the rotary shaft 20c, as described above, a three-phase alternating voltage is generated using phases that satisfy a positive load angle θ so as to ensure that the rotating magnetic field can continuously attract the rotor 22a. The inverter 24 that utilizes variable voltage variable frequency control raises the frequency while increasing the amplitude of the three-phase alternating voltage as shown in FIG. 6A as acceleration proceeds (that is, as the rotational speed of the rotor 22a increase). The torque that the electric motor 22 generates is approximately proportional to the size of an electric current applied to the electric motor 22. Consequently, in the case of increasing the speed of acceleration of the rotary shaft 20c (rotor 22a) based on an instruction from the ECU 50, the inverter 24 increases the amplitude of the three-phase alternating voltage.

Next, the deceleration waveform will be described. In a case where a negative load angle (that is, a load angle (−θ) having the opposite symbol to the load angle θ that is used when a driving torque is imparted) arises as shown in FIG. 4 when the rotor 22a rotates in synchrony with the rotating magnetic field, a repelling force with respect to the rotating magnetic field acts on the magnet 22a1. Since this force acts in a direction that hinders rotation of the rotor 22a, the electric motor 22 generates a braking torque. Accordingly, in this case, the electric motor 22 imparts a braking torque to the rotary shaft 20c of the turbosupercharger 20 and can thus decelerate the rotation of the rotary shaft 20c.

With respect to a time of deceleration also, similarly to a time of acceleration, an alternating voltage in which the respective phases are 120° out of phase with each of the other phases in the order of the U-phase, V-phase and W-phase as shown in FIG. 6B is used. However, in the case of deceleration, as deceleration proceeds (that is, as the rotational speed of the rotor 22a decreases), the inverter 24 lowers the frequency while reducing the amplitude of the three-phase alternating voltage as shown in FIG. 6B. Further, in a case of enhancing the deceleration of the rotary shaft 20c (rotor 22a) based on an instruction from the ECU 50, the inverter 24 increases the amplitude of the three-phase alternating voltage.

(Specific Processing in First Embodiment)

Figure 7:
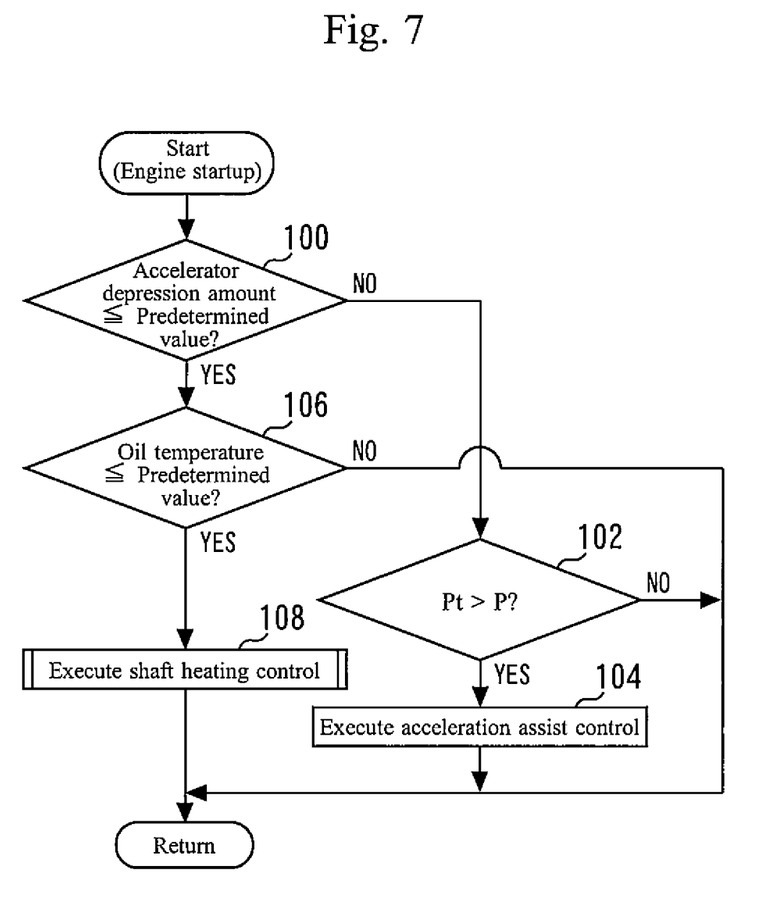
FIG. 7 is a flowchart of a main routine that is executed in the first embodiment of the present invention.

FIG. 7 is a flowchart that illustrates a main routine that the ECU 50 executes for realizing electric motor control including shaft heating control in the first embodiment of the present invention. Note that the present routine is started when starting the internal combustion engine 10, and is thereafter repeatedly executed for each predetermined control period.

In the main routine shown in FIG. 7, first, the ECU 50 proceeds to step 100. In step 100 the ECU 50 determines whether or not the accelerator depression amount is less than or equal to a predetermined value. As one example, the predetermined value is a value of around 30% out of the full depression amount of the accelerator pedal. More specifically, the predetermined value is changed as shown in FIG. 8, which is described hereunder, in accordance with an engine speed that is calculated using output signals of the crank angle sensor 52.

Figure 8:
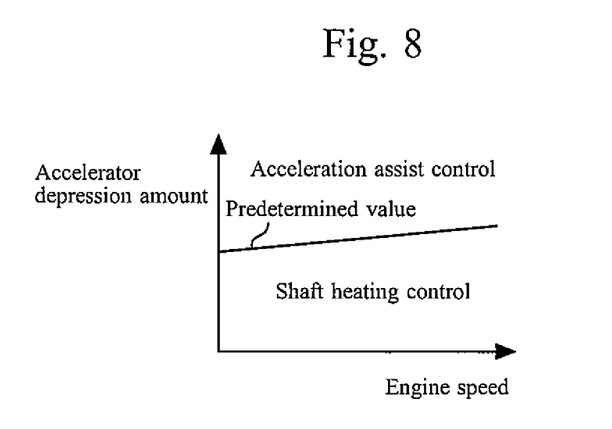
FIG. 8 is a map that is used for determining which of shaft heating control and acceleration assist control is to be used, based on an accelerator depression amount and an engine speed.

FIG. 8 is a map that is used for determining which control among the shaft heating control and acceleration assist control is to be used, based on the accelerator depression amount and the engine speed. According to this map, in a range on a large accelerator depression amount side the acceleration assist control is selected, while in a range on a small accelerator depression amount side the shaft heating control is selected. The term "acceleration assist control" refers to control that, unlike that above described shaft heating control, uses only the above described acceleration waveform to support acceleration by means of electric assist. A value that corresponds to the accelerator depression amount at the boundary between these two ranges is the aforementioned predetermined value, and the predetermined value is set so as to increase as the engine speed increases. That is, according to this setting, when the engine speed is high, the shaft heating control is executed even at a time of using a larger accelerator depression amount in comparison to when the engine speed is low.

If the result determined in step 100 is negative, the ECU 50 proceeds to step 102 to determine whether or not a target intake air pressure Pt is higher than an actual intake air pressure P. The target intake air pressure Pt is an intake air pressure that is needed for realizing a required torque that is calculated based on the accelerator depression amount. The actual intake air pressure P is detected using the intake air pressure sensor 36. During a period in which the target intake air pressure Pt is determined as being higher than the actual intake air pressure P in step 102 under circumstances in which the result determined in step 100 is negative, the ECU 50 proceeds to step 104 to execute the acceleration assist control. In a case where the result determined in step 102 is negative, that is, in a case where a difference (Pt−P) is not found between the intake air pressures, the ECU 50 ends the current processing cycle at once.

On the other hand, if the result determined in step 100 is affirmative, the ECU 50 proceeds to step 106. In step 106, the ECU 50 determines whether or not the lubricating oil temperature is less than or equal to a predetermined value (as one example, 30° C.). As one example, the ECU 50 detects the temperature of lubricating oil in a main gallery using the oil temperature sensor 56. The ECU 50 determines whether or not the temperature is less than or equal to the predetermined value. The main gallery is a portion that is formed in the engine block as a main oil passage for supplying engine lubricating oil to each part (including the bearings 20d) of the internal combustion engine 10. However, the determination as to whether or not the lubricating oil temperature is less than or equal to a predetermined value in the present disclosure is not limited to a determination performed by directly detecting the lubricating oil temperature, and may be, for example, a determination that is based on an engine cooling water temperature that is detected by the water temperature sensor 54 instead of the lubricating oil temperature.

Figure 9:
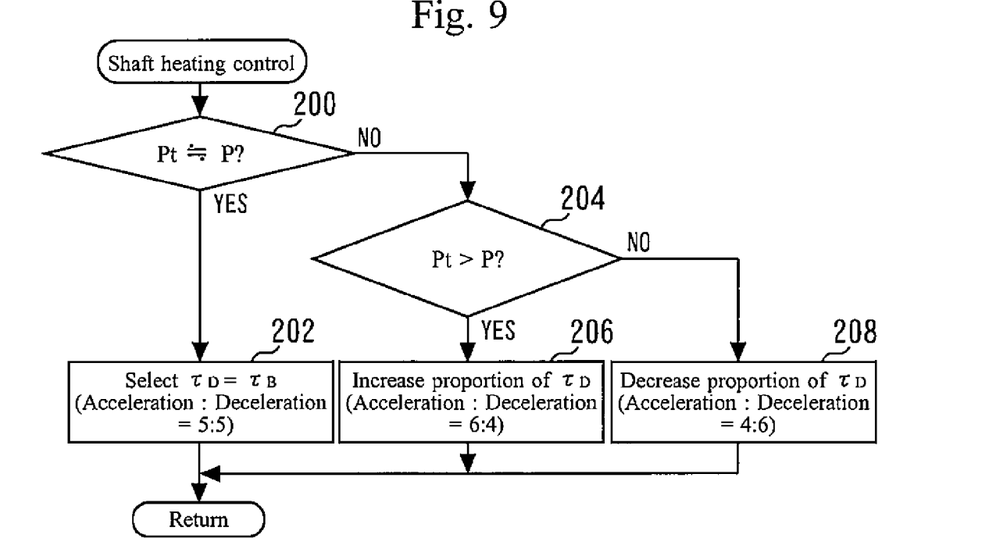
FIG. 9 is a flowchart of a subroutine that is executed in the first embodiment and a second embodiment of the present invention.

In a case where the result determined in step 106 is negative, that is, in a case where the lubricating oil temperature is higher than the aforementioned predetermined value or a case where the accelerator depression amount is larger than the aforementioned predetermined value, the ECU 50 ends the current processing cycle at once. In contrast, when the result determined in step 106 is affirmative, that is, when the lubricating oil temperature is less than or equal to the aforementioned predetermined value in a case where the accelerator depression amount is less than or equal to the aforementioned predetermined value, the ECU 50 proceeds to step 108 to execute the shaft heating control. In step 108, a series of processing of a subroutine illustrated in FIG. 9 is executed. The shaft heating control is executed until the lubricating oil temperature exceeds the aforementioned predetermined value, on the condition that the accelerator depression amount is less than or equal to the aforementioned predetermined value.

FIG. 9 is a flowchart illustrating a subroutine in which processing relating to the shaft heating control is defined. In the subroutine illustrated in FIG. 9, first, in step 200, the ECU 50 determines whether or not the target intake air pressure Pt is equal or substantially equal to the actual intake air pressure P. If the result determined in step 200 is affirmative, the ECU 50 proceeds to step 202 to select 5 to 5 as a ratio of the respective proportions of the driving torque impartation period (acceleration period) $\tau_D$ and the braking torque impartation period (deceleration period) $\tau_B$ for executing the shaft heating control, that is, to set the two periods as equal periods.

On the other hand, if the result determined in step 200 is negative, the ECU 50 advances to step 204 to determine whether or not the target intake air pressure Pt is higher than (outside a range in which the pressures are substantially equal) the actual intake air pressure P. If the result determined in step 204 is affirmative, the ECU 50 proceeds to step 206 to select 6 to 4 as the ratio of the respective proportions of the driving torque impartation period (acceleration period) $\tau_D$ and the braking torque impartation period (deceleration period) $\tau_B$ for executing the shaft heating control. That is, in this case, the proportion of the driving torque impartation period (acceleration period) $\tau_D$ is increased in comparison to when the target intake air pressure Pt and the actual intake air pressure P are equal or substantially equal. Further, according to the processing of the present routine, the aforementioned proportions that are selected when the result determined in step 204 is affirmative are kept constant at the ratio of 6 to 4. However, instead of this processing, a configuration may be adopted in which the proportion of the driving torque impartation period (acceleration period) $\tau_D$ is increased as a difference between the target intake air pressure Pt and the actual intake air pressure P increases (that is, as the degree of the acceleration request increases).

Further, in a case where the result determined in step 204 is negative, that is, in a case where the target intake air pressure Pt is lower than the actual intake air pressure (outside a range in which the pressures are substantially equal), the ECU 50 proceeds to step 208. In step 208, the ECU 50 selects 4 to 6 as the ratio of the respective proportions of the driving torque impartation period (acceleration period) $\tau_D$ and the braking torque impartation period (deceleration period) $\tau_B$ for executing the shaft heating control. That is, in this case, the proportion of the driving torque impartation period (acceleration period) $\tau_D$ is decreased in comparison to when the target intake air pressure Pt and the actual intake air pressure P are equal or substantially equal. Further, according to the processing of the present routine, the aforementioned proportions that are selected when the result determined in step 204 is affirmative are kept constant at the ratio of 4 to 6. However, instead of this processing, a configuration may be adopted in which the proportion of the driving torque impartation period (acceleration period) $\tau_D$ is decreased as a difference between the target intake air pressure Pt and the actual intake air pressure P increases (that is, as the degree of the deceleration request decreases).

According to the routines illustrated in FIG. 7 and FIG. 9 that are described above, the shaft heating control is executed when, after engine startup, the lubricating oil temperature is less than or equal to the aforementioned predetermined value in a case where the accelerator depression amount is less than or equal to the aforementioned predetermined value. As a result, a magnetic flux change in the stator coil 22b2 is repeatedly generated for imparting a driving torque (that is, acceleration of the rotary shaft 20c) from the electric motor 22 to the rotary shaft 20c and imparting a braking torque (that is, deceleration of the rotary shaft 20c) from the electric motor 22 to the rotary shaft 20c, and hence an eddy current can be efficiently generated at the surfaces of metal members, such as the rotary shaft 20c. Further, the proportion occupied by the driving torque impartation period $\tau_D$ during the cycle T is changed in accordance with a result of comparing the size of the target intake air pressure Pt and the size of the actual intake air pressure P. More specifically, in a case where the target intake air pressure Pt and the actual intake air pressure P are equal or substantially equal, energization of the electric motor 22 is controlled so that the proportion of the driving torque impartation period $\tau_D$ and the proportion of the braking torque impartation period $\tau_B$ become equal. By this means, induction heating can be utilized while suppressing fluctuations in the rotational speed (that is, the turbo rotational speed) of the rotary shaft 20c accompanying execution of the shaft heating control and fluctuations in the intake air pressure that accompany such fluctuations. In addition, in a case where the target intake air pressure Pt is higher than the actual intake air pressure P, the proportion of the driving torque impartation period $\tau_D$ is raised. In this case, the rotary shaft 20c is caused to accelerate overall while alternately repeating acceleration and deceleration of the rotary shaft 20c. By this means, as the control of the electric motor 22, while placing emphasis on the shaft heating control, electric assist can also be performed to accompany an operation to bring the actual intake air pressure P close to the target intake air pressure Pt by adjusting the throttle valve 34 or by adjusting the throttle valve 34 and the WGV 40. It can be said that this similarly applies in a case where the target intake air pressure Pt is lower than the actual intake air pressure P.

According to the control of the present embodiment described above, heating of lubricating oil that is used for the electric-motor-assisted turbosupercharger 20 can be performed while favorably achieving both efficient generation of an eddy current and intake air pressure control during utilization of induction heating. Further, by quickly raising the temperature of the lubricating oil at the time of a low oil temperature, as mentioned above, the fuel efficiency of the vehicle can be improved by enhancing the efficiency of the turbosupercharger 20. In addition, by heating the lubricating oil in advance, friction between the rotary shaft 20c and the bearings 20d when performing electric assist thereafter is reduced, and hence an increase in the turbo rotational speed occurs more quickly. Consequently, the drivability of the internal combustion engine 10 improves. Furthermore, since the amount of oil to be supplied to the bearings 20d can be adequately securely by making the viscosity of the lubricating oil the appropriate viscosity, the occurrence of a malfunction such as seizure between the rotary shaft 20c and the bearings 20d can be avoided. Therefore, the reliability of the bearings 20d can be ensured to a higher degree. Further, since the above described heating of the lubricating oil can be performed without the need to change the hardware configuration such as the electric-motor-assisted turbosupercharger 20 and the inverter 24, the present configuration does not lead to an increase in costs.

Furthermore, the shaft heating control of the present embodiment is performed in a case where, as described above, the accelerator depression amount is less than or equal to the aforementioned predetermined value. That is, in a case where the accelerator depression amount is higher than the aforementioned predetermined value (that is, in a case where the internal combustion engine 10 is requested to generate a high engine torque), since acceleration is given priority over increasing the lubricating oil temperature to thereby satisfy the request of the driver, it is possible to ensure that the drivability of the internal combustion engine 10 is not inhibited by execution of the shaft heating control.

Further, in a case where the target intake air pressure Pt is higher than the actual intake air pressure P, if control that increases the proportion of the driving torque impartation period (acceleration period) $\tau_D$ as the difference between the target intake air pressure Pt and the actual intake air pressure P increases (that is, as the degree of the acceleration request increases) is adopted, in comparison to a case where the aforementioned control is not adopted and the proportion of the driving torque impartation period (acceleration period) $\tau_D$ is made constant irrespective of the aforementioned difference, shaft heating control can be performed while ensuring that the actual intake air pressure P conforms with the target intake air pressure Pt more accurately. It can be said that this similarly applies in a case where, when the target intake air pressure Pt is lower than the actual intake air pressure P, control is adopted that decreases the proportion occupied by the driving torque impartation period (acceleration period) $\tau_D$ as the difference between the target intake air pressure Pt and the actual intake air pressure P increases (that is, as the degree of the deceleration request decreases).

Note that, in the above described first embodiment, the ECU 50 executing the processing in step 108 in a case where the results determined in steps 100 and 106 are both affirmative corresponds to the "controller" in the present disclosure.

Second Embodiment

Next, a second embodiment of the present invention will be described referring to FIG. 10 to FIG. 12.

[System Configuration of Second Embodiment]

Figure 10:
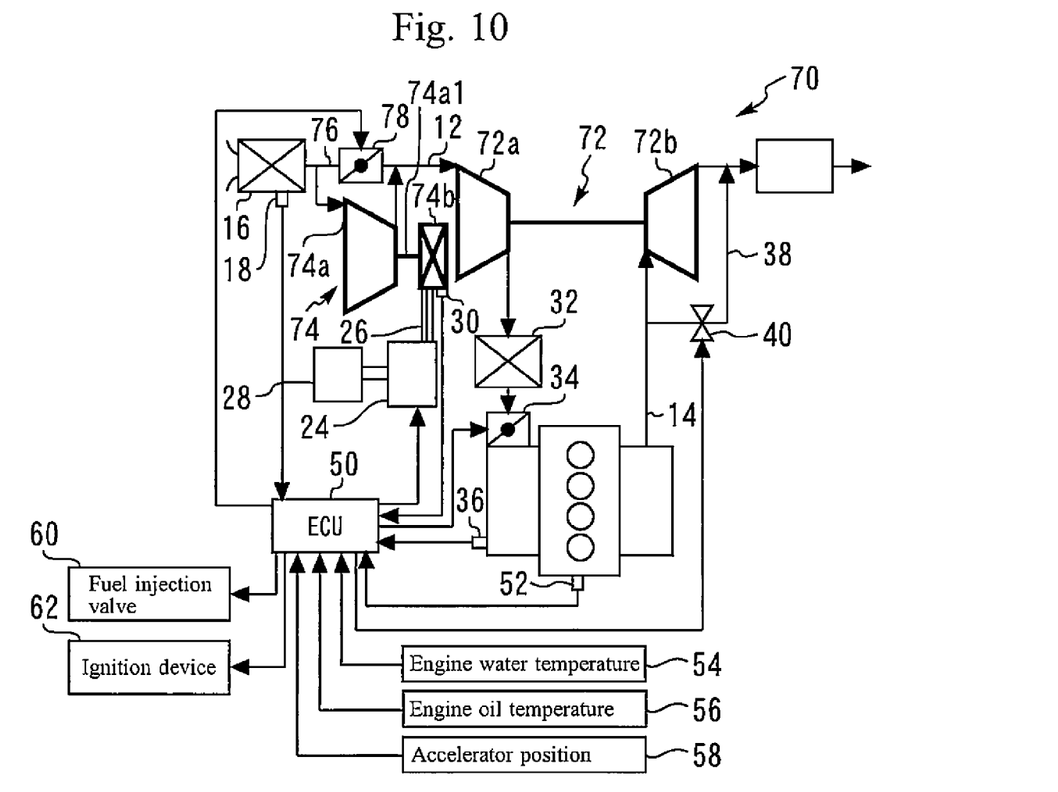
FIG. 10 is a view for schematically illustrating a system configuration according to the second embodiment of the present invention.

FIG. 10 is a view for schematically illustrating the system configuration according to the second embodiment of the present invention. The main difference between the system of the present embodiment and the system of the first embodiment is that, instead of the electric-motor-assisted turbosupercharger 20 that is also an electric supercharger, an internal combustion engine 70 includes a turbosupercharger 72 and an electric supercharger 74 individually. Note that, in FIG. 10, elements that are the same as constituent elements illustrated in the above described FIG. 1 are denoted by the same reference symbols, and a description of those elements is omitted or simplified hereunder.

More specifically, although the relative arrangement relation between the turbosupercharger 72 and the electric supercharger 74 is not particularly limited, in the configuration shown in FIG. 10, as one example, a compressor 74a (hereunder, referred to as "electric compressor 74a") of the electric supercharger 74 is disposed in the intake passage 12 on an upstream side of a compressor 72a of the turbosupercharger 72. The electric compressor 74a is driven by an electric motor 74b. As one example, it is assumed that the electric motor 74b is a permanent magnet synchronous electric motor similarly to the electric motor 22. Unlike the electric-motor-assisted turbosupercharger 20 of the first embodiment, ball bearings for which grease is generally utilized as a lubricant are used as bearings of the rotary shaft in the electric compressor. It is assumed that ball bearings (not illustrated in the drawings) are also used for a rotary shaft 74a1 of the electric compressor 74a. Further, an intake bypass passage 76 that bypasses the compressor 74a and an intake bypass valve 78 that opens and closes the intake bypass passage 76 are provided. The intake bypass valve 78 is electrically connected to the ECU 50, and is opened when the electric compressor 74a is actuated. Reference character 72b in FIG. 10 denotes a turbine. Although a case is described here of an example in which the electric supercharger 74 is combined with the turbosupercharger 72, a supercharger that is an object to be combined with the electric supercharger 74 is not limited to a turbosupercharger.

[Control of Second Embodiment]

With respect to driving of the electric compressor 74a using the electric motor 74b also, the driving can be controlled using the inverter 24 similarly to driving of the electric motor 22 in the first embodiment. In the case of the electric compressor 74a also, similarly to the electric-motor-assisted turbosupercharger 20, it is desired to raise the temperature of the grease at a time that the temperature of the grease is low, such as immediately after engine startup. Therefore, according to the present embodiment, shaft heating control that is similar to the shaft heating control described in the first embodiment is performed with respect to the electric compressor 74a. Note that, the shaft heating control of the present embodiment may also be applied to the system of an internal combustion engine that includes only the electric supercharger 74 as a supercharger.

(Specific Processing in Second Embodiment)

Hereunder, with reference to FIG. 11, electric motor control including the shaft heating control for the electric compressor 74a will be described in a manner that centers on differences relative to the first embodiment. FIG. 11 is a flowchart illustrating a main routine that the ECU 50 executes to realize electric motor control including the shaft heating control in the second embodiment of the present invention.

Figure 11:
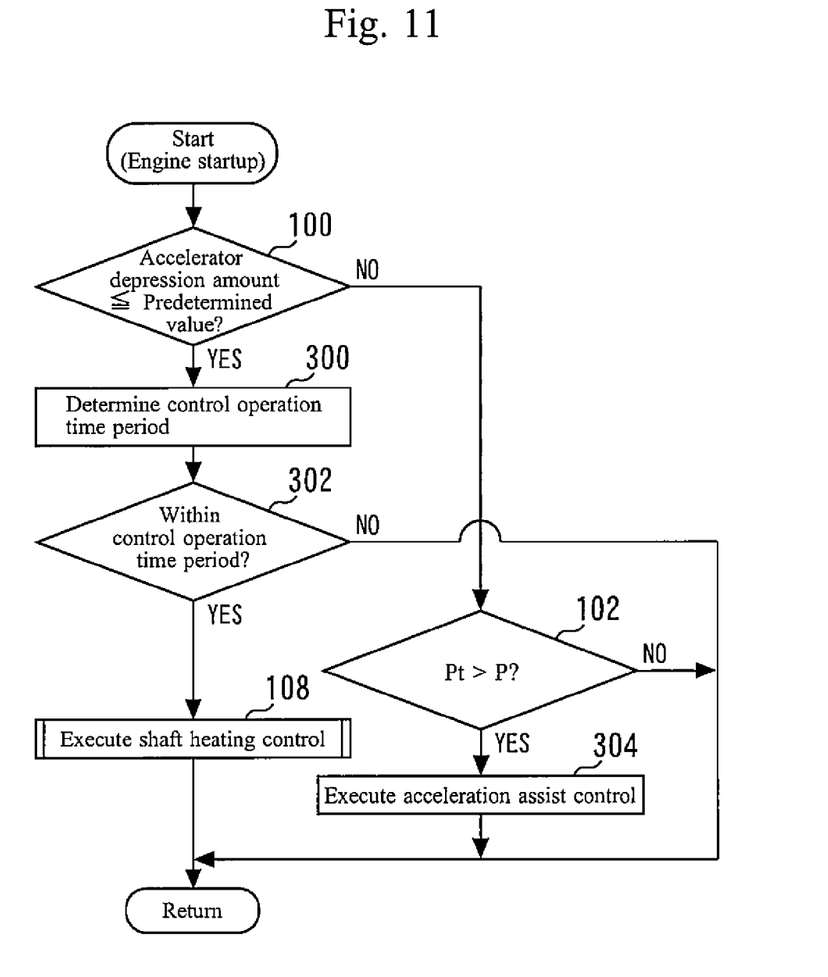
FIG. 11 is a flowchart of a main routine that is executed in the second embodiment of the present invention.
Figure 12:
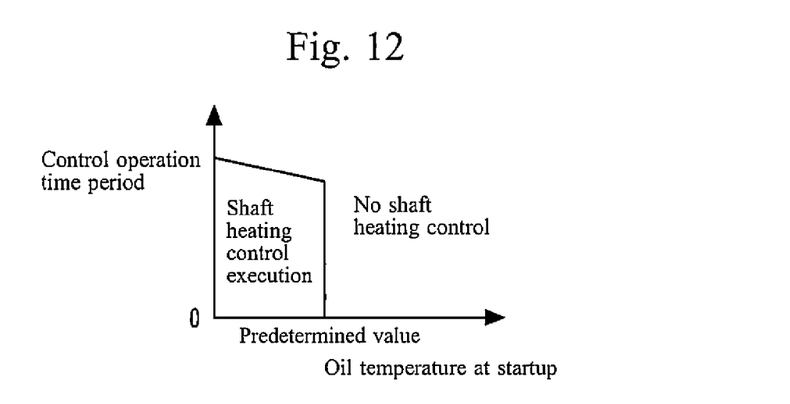
FIG. 12 is a map that defines a control operation time period based on a relation with the temperature of engine lubricating oil at engine startup.

According to the main routine illustrated in FIG. 11, when the ECU 50 determines in step 100 that the accelerator depression amount is less than or equal to the aforementioned predetermined value, the ECU 50 proceeds to step 300. In step 300, the ECU 50 determines a control operation time period in which to perform the shaft heating control. FIG. 12 is a map that defines a control operation time period based on a relation with the temperature of engine lubricating oil at engine startup. The ECU 50 stores such a map, and refers to the map to determine a control operation time period based on the oil temperature at startup. According to the map shown in FIG. 12, when the oil temperature at startup is less than or equal to a predetermined value (as one example, 30° C.), the control operation time period is set so that, the lower that the oil temperature at startup is, the longer that the control operation time period becomes. In a case where the oil temperature at startup is higher than the aforementioned predetermined value, the control operation time period is set to zero. Note that, the control operation time period is determined here by using the temperature of the engine lubricating oil to estimate the temperature of the grease of the electric compressor 74a at the time of engine startup. The control operation time period may also be determined based on the engine cooling water temperature at engine startup instead of by the aforementioned technique that utilizes the oil temperature at startup.

Next, the ECU 50 proceeds to step 302 to determine whether or not the elapsed time period after engine startup is within the control operation time period. When the result determined in step 302 is negative, that is, when the control operation time period has already elapsed or when the accelerator depression amount is greater than the aforementioned predetermined value, the ECU 50 ends the current processing cycle at once. On the other hand, when the result determined in step 302 is affirmative, the ECU 50 proceeds to step 108. Further, in a case where the result determined in step 102 is affirmative, the ECU 50 proceeds to step 304. In step 304, the ECU 50 executes predetermined acceleration assist control for a case of utilizing the electric compressor 74a. The processing in step 108 that corresponds to the series of processing in the subroutine shown in FIG. 9 that relates to the shaft heating control and step 102 can be performed similarly to the case of utilizing the electric-motor-assisted turbosupercharger 20, and a detailed description thereof is omitted here.

According to the routines that are illustrated in FIG. 11 and FIG. 9 described above, also in the case of utilizing the electric compressor 74a as an electric supercharger, the same advantageous effects can be obtained as those obtained by the shaft heating control of the first embodiment.

Note that, in the above described second embodiment, the ECU 50 executing the processing in step 108 in a case where the respective results determined in steps 100, 300 and 302 are affirmative corresponds to the "controller" in the present disclosure.

In addition to the control of the first or second embodiment, in a case where the temperature of the lubricant is low when starting the shaft heating control, the electric current or voltage that is applied to the electric motor 22 or electric motor 74b during execution of the shaft heating control may be increased in comparison to a case where the temperature of the lubricant is high. By this means, induction heating can be further promoted when the temperature of the lubricant is low. With regard to the control described here, an example of specific processing in a case where the electric-motor-assisted turbosupercharger 20 is taken as an object is described hereunder referring to FIG. 13 and FIG. 14.

Figure 13:
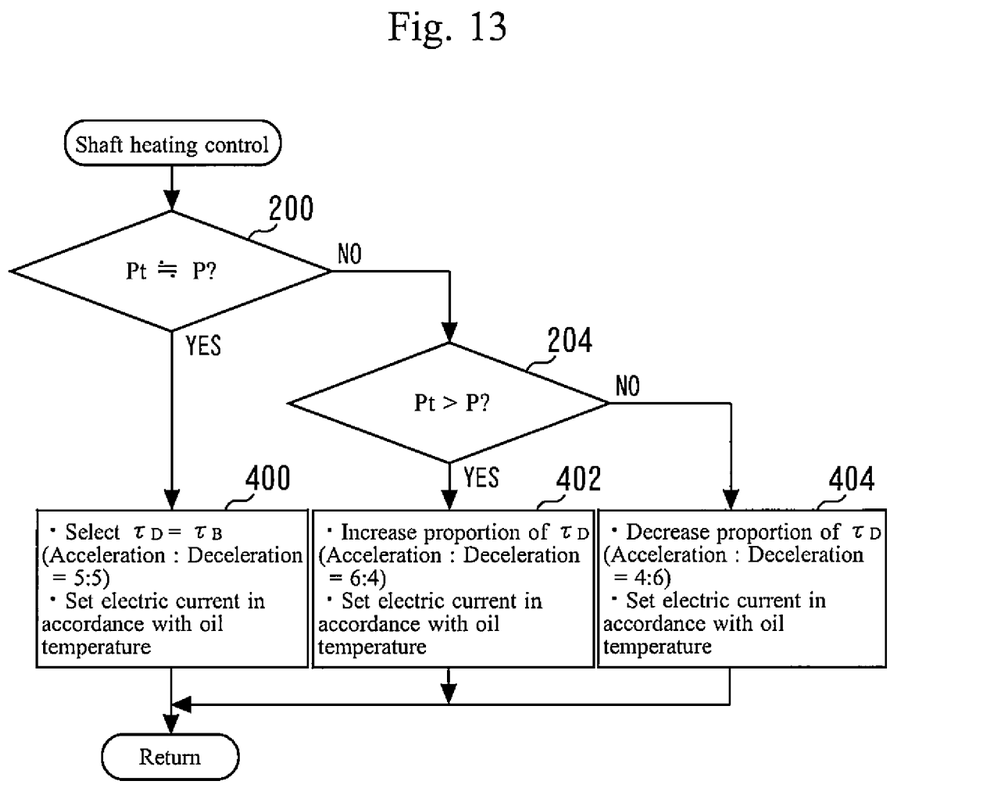
FIG. 13 is a flowchart illustrating another example of a subroutine that defines processing relating to shaft heating control.

FIG. 13 is a flowchart illustrating another example of a subroutine that defines processing relating to the shaft heating control. In the flowchart shown in FIG. 13, a difference to the flowchart illustrated in FIG. 9 is that the processing in steps 202, 206 and 208 in FIG. 9 is replaced by steps 400, 402 and 404, respectively.

Figure 14:
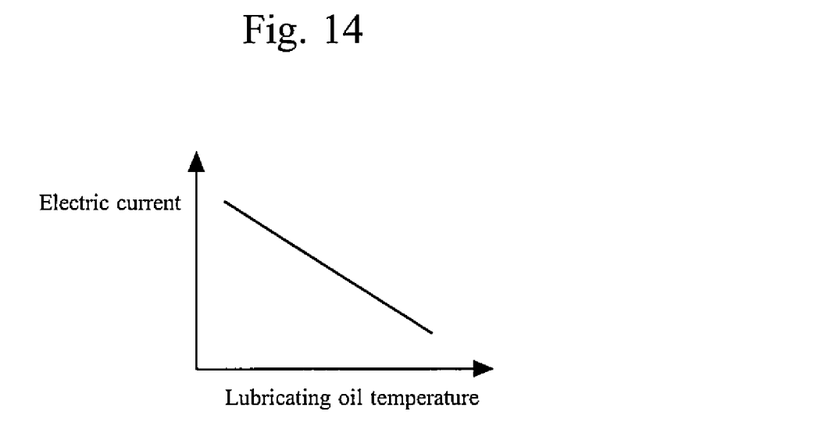
FIG. 14 is a view representing a relation between an electric current that is applied to an electric motor and a lubricating oil temperature.

In step 400, the ECU 50 selects a ratio of 5 to 5 as the proportions of the driving torque impartation period (acceleration period) $\tau_D$ and the braking torque impartation period (deceleration period) $\tau_B$ and also sets an electric current to be applied to the electric motor 22 to a value that is in accordance with the lubricating oil temperature. FIG. 14 is a view that represents a relation between the electric current that is applied to the electric motor 22 and the lubricating oil temperature. According to the relation illustrated in FIG. 14, the electric current is set so as to increase as the lubricating oil temperature becomes lower. The ECU 50 stores this relation as a map, and refers to the map to set an electric current that is in accordance with the lubricating oil temperature. Note that, although FIG. 14 illustrates an example in which the electric current applied to the electric motor 22 is changed in accordance with the lubricating oil temperature, a configuration may also be adopted in which the electric current in FIG. 14 is replaced by the voltage, and a voltage that is applied to the electric motor 22 is changed in accordance with the lubricating oil temperature.

In step 402, the ECU 50 selects a ratio of 6 to 4 as the proportions of the driving torque impartation period (acceleration period) $\tau_D$ and the braking torque impartation period (deceleration period) $\tau_B$ and also sets the electric current in accordance with the lubricating oil temperature by the same processing as in step 400. Further, in step 404, the ECU 50 selects a ratio of 4 to 6 as the proportions of the driving torque impartation period (acceleration period) $\tau_D$ and the braking torque impartation period (deceleration period) $\tau_B$ and also sets the electric current in accordance with the lubricating oil temperature by the same processing as in step 400.

Further, in the first and second embodiments, attention is focused on one cycle T that is a minimum unit of intermittent operation in which impartation of a driving torque and impartation of a braking torque are alternately performed, as shown in FIG. 5, and the proportion that the driving torque impartation period $\tau_D$ occupies in the one cycle T is changed in accordance with a result of a comparison between the target intake air pressure and the actual intake air pressure. However, a unit period that is taken as an object when changing the proportion of the driving torque impartation period in accordance with a result of a comparison between the target intake air pressure and the actual intake air pressure in the present disclosure is not limited to a period that is equal to one cycle T, and may be a period that includes a plurality of cycles. That is, for example, a configuration may also be adopted in which, in a case where 6 to 4 is selected as the ratio of the proportions of the driving torque impartation period (acceleration period) $\tau_D$ and the braking torque impartation period (deceleration period) $\tau_B$ by the processing in step 206, after taking a period corresponding to two cycles T as the unit period that is the object, a ratio of the proportions of 6 to 4 is realized as the total of the proportions in the aforementioned unit period by selecting 2 to 2 as the ratio of the proportions of $\tau_D$ and $\tau_B$ for the first cycle and selecting 4 to 2 as the ratio of the proportions of $\tau_D$ and $\tau_B$ for the second cycle.

Further, the first and second embodiments are described taking as an example a case where the energization of the electric motor 22 or the like is controlled so that a braking torque in imparted from the electric motor 22 or the like to the rotary shaft 20c or the like during a period in which impartation of the driving torque is stopped. However, an "intermittent operation" in the present disclosure is not limited to an operation that is executed in the above described form, and may be an operation in which electric power is not supplied to the electric motor during a period in which impartation of the driving torque is stopped. That is, for example, in the case of the electric motor 22 or the like that is a permanent magnet synchronous electric motor, the "intermittent operation" may be an operation in which, with regard to the driving torque impartation period $\tau_D$, for example, the waveform illustrated in FIG. 6A is utilized to impart a three-phase alternating voltage to the electric motor 22 or the like, and with regard to the braking torque impartation period $\tau_B$, application of the aforementioned alternating voltage is stopped. However, in a case where a configuration is adopted so as to impart a braking torque during a period in which impartation of the driving torque is stopped as in the first embodiment and the like, since an eddy current that arises during the period can also be utilized, it is possible to generate an eddy current more efficiently.

Further, in the first and second embodiments, a permanent magnet synchronous electric motor that utilizes a three-phase alternating current is taken as an example of the configuration of the electric motors 22 and 74b, and a technique is described that controls energization of an electric motor so that a driving torque and a braking torque are alternately imparted to the rotary shaft of an electric supercharger. However, an electric motor that is an object of the present disclosure is not limited to the aforementioned permanent magnet synchronous electric motor, and the kind of electric motor is not particularly limited, including whether the electric motor is an alternating-current motor or a direct-current motor. That is, it is sufficient that intermittent operation is performed by, for example, controlling energization of the electric motor so that a driving torque and a braking torque are alternately imparted to the rotary shaft of an electric supercharger in accordance with a control technique of a rotational speed that is used for the electric motor that is adopted. In the case of a direct-current motor, for example, a driving torque and a braking torque can be alternately imparted to the rotary shaft by alternately switching the orientation of the electric current that is supplied to the electric motor for execution of the intermittent operation. Further, for example, a configuration may also be adopted so as to intermittently impart a driving force to the rotary shaft by alternately switching energization of the electric motor off and on without changing the orientation of the electric current that is supplied to the electric motor for execution of the intermittent operation.

Further, the following configuration may be added to the internal combustion engine 10 of the first embodiment or the internal combustion engine 70 of the second embodiment. That is, a configuration may also be adopted in which the power line 26 that connects the electric motor 22 or 74b and the inverter 24 is wound in a coil shape on the exhaust pipe in an area surrounding a heating object such as an exhaust gas purification catalyst. By this means, when an alternating current is supplied to the electric motor 22 or 74b from the inverter 24, an eddy current is generated in the exhaust pipe around which the power line 26 is wound, and the heating object, such as the exhaust gas purification catalyst is heated by utilizing Joule heat (induction heating) generated by the eddy current. At a time of a low lubricant temperature when the shaft heating control is performed, since a heating object such as an exhaust gas purification catalyst is also cold, the heating object is also effectively warmed up by utilizing the shaft heating control.

The invention claimed is:

1. A control apparatus for an internal combustion engine which includes an electric supercharger, the electric supercharger having a compressor that is disposed in an intake passage and that is configured to supercharge intake air and an electric motor that is configured to drive a rotary shaft of the compressor, the rotary shaft being made of metal and having a bearing that is lubricated by a lubricant,
the control apparatus comprising a controller that is configured to, when a temperature of the lubricant is less than or equal to a predetermined temperature, control energization of the electric motor so that intermittent operation of the electric motor is executed,
wherein, during the intermittent operation of the electric motor, a driving torque from the electric motor to the rotary shaft is alternately imparted and stopped,
wherein when a target intake air pressure is higher than an actual intake air pressure, the controller is configured to set a ratio between alternate durations of imparting and stopping the driving torque within a full cycle of the intermittent operation by increasing a proportion of a driving torque impartation duration in the full cycle compared to when the target intake air pressure is equal to the actual intake air pressure, and
when the target intake air pressure is lower than the actual intake air pressure, the controller is configured to decrease the proportion of the driving torque impartation duration in the full cycle compared to when the target intake air pressure is equal to the actual intake air pressure.

2. The control apparatus according to claim 1, wherein the controller is configured to control energization of the electric motor so that a braking torque is imparted from the electric motor to the rotary shaft for a duration of stopping the driving torque within the full cycle of the intermittent operation.

3. The control apparatus according to claim 1, wherein, when the target intake air pressure is higher than the actual intake air pressure, the controller is configured to increase the proportion of the driving torque impartation duration in the full cycle as a difference between the target intake air pressure and the actual intake air pressure increases.

4. The control apparatus according to claim 1, wherein, when the target intake air pressure is lower than the actual intake air pressure, the controller is configured to decrease the proportion of the driving torque impartation duration in the full cycle as a difference between the target intake air pressure and the actual intake air pressure increases.

5. The control apparatus according to claim 1, wherein the controller is configured to execute the intermittent operation when a depression amount of an accelerator pedal of a vehicle in which the internal combustion engine is mounted is less than or equal to a predetermined amount.

6. The control apparatus according to claim 1, wherein, when the temperature of the lubricant is lower than or equal to the predetermined temperature, the controller is configured to increase an electric current or an electric voltage that is applied to the electric motor to execute the intermittent operation compared to when the temperature of the lubricant is higher than the predetermined temperature.

7. The control apparatus according to claim 1, wherein the electric supercharger is an electric-motor-assisted turbosupercharger that further includes a turbine that is driven by exhaust energy.

* * * * *

UNITED STATES PATENT AND TRADEMARK OFFICE
CERTIFICATE OF CORRECTION

PATENT NO. : 9,896,997 B2
APPLICATION NO. : 14/922477
DATED : February 20, 2018
INVENTOR(S) : Masayuki Tanada It is certified that error appears in the above-identified patent and that said Letters Patent is hereby corrected as shown below:

In the Claims

At Column 17, Line 58, change "predetermined temperture," to "predetermined temperature"

Signed and Sealed this
Fourth Day of September, 2018

Andrei Iancu
*Director of the United States Patent and Trademark Office*